United States Patent
Ishida et al.

[11] Patent Number: 5,590,711
[45] Date of Patent: Jan. 7, 1997

[54] HEAT TRANSFER TUBE FOR ABSORBER

[75] Inventors: Seiji Ishida, Hatano; Takashi Kuriyama, Tokyo, both of Japan

[73] Assignee: Kabushiki Kaisha Kobe Seiko Sho, Kobe, Japan

[21] Appl. No.: 357,275

[22] Filed: Dec. 13, 1994

[30] Foreign Application Priority Data

Dec. 14, 1993 [JP] Japan ................................ 5-313861

[51] Int. Cl.$^6$ ................................................ F28F 1/42
[52] U.S. Cl. ........................................ 165/179; 165/181
[58] Field of Search ........................... 165/184, 181, 165/179, 133

[56] References Cited

U.S. PATENT DOCUMENTS

| | | | |
|---|---|---|---|
| 3,177,936 | 4/1965 | Walter | 165/179 |
| 3,217,799 | 11/1965 | Rodgers | 165/179 |
| 3,273,599 | 9/1966 | Heeren | 165/179 |
| 3,779,312 | 12/1973 | Withers, Jr. et al. | 165/184 |
| 3,875,997 | 4/1975 | Newson et al. | 165/179 X |
| 4,245,697 | 1/1981 | Togashi | 165/179 |
| 4,827,074 | 5/1989 | Suwa et al. | 165/179 X |
| 4,858,682 | 8/1989 | Odelstam | 165/179 X |
| 5,353,865 | 10/1994 | Adiutori et al. | 165/133 |

FOREIGN PATENT DOCUMENTS

| | | | |
|---|---|---|---|
| 347773 | 1/1922 | Germany | 165/179 |
| 0127896 | 5/1989 | Japan | 165/179 |
| 2071062 | 3/1990 | Japan | 165/133 |

*Primary Examiner*—John Rivell
*Assistant Examiner*—Christopher Atkinson
*Attorney, Agent, or Firm*—Oblon, Spivak, McClelland, Maier & Neustadt, P.C.

[57] ABSTRACT

A heat transfer tube for an absorber, including a plurality of crest portions and trough portions extending in parallel to each other in an axial direction of the tube and arranged alternately in a circumferential direction of the tube. The ratio d/P of a depth d of each of the trough portions to a pitch P of the crest portions defined as $P=\pi D/n$ is set in the range of 0.1 to 0.4; the depth d is set in the range of 1.50 to 2.00 mm; the ratio $R_2/d$ is set in the range of 2.5 to 6.0; the ratio $R_1/R_2$ is set larger than 1, where n represents a positive integer, $R_1$ represents a radius of curvature of an outer top surface of each crest portion, $R_2$ represents a radius of curvature of an outer bottom surface of each trough portion, and D represents a diameter of a circumscribed circle of the crest portions. Accordingly, the turbulence (Marangoni convection) of the absorbing liquid can be promoted, the wetted area can be widened, and the residence time of the absorbing liquid can be optimized, thereby improving the heat transfer performance.

1 Claim, 3 Drawing Sheets

HEAT TRANSFER TUBE FOR ABSORBER

BACKGROUND OF THE INVENTION

1. Field of the Invention

The present invention relates to a heat transfer tube having an improved heat transfer performance for use with an absorber in an absorption refrigerating machine, absorption cooling and heating machine, etc.

2. Description of the Related Art

An absorption refrigerating machine employs a solution of lithium bromide (LiBr) which is a part of salt as an absorbing liquid and water as a refrigerant. Water vapor in the refrigerating machine is absorbed by a strong moisture absorbing power of the lithium bromide to reduce pressure in the refrigerating machine, and the water as a refrigerant is vaporized at a low temperature to thereby make a cold water to be used for air conditioning or the like.

In an absorber of the absorption refrigerating machine, a plurality of heat transfer tubes are horizontally arranged. Water is fed to flow in the heat transfer tubes, and the absorbing liquid is dripped onto the outer surfaces of the heat transfer tubes, thereby performing heat exchange between the water and the absorbing liquid. A smooth tube is conventionally used as each heat transfer tube. The absorbing liquid dripped flows down on the outer surface of the smooth tube at a low velocity, that is, in the state of laminar flow. Accordingly, a surface active agent is added to the absorbing liquid to generate Marangoni convection upon absorption of water vapor, thereby promoting the turbulence of the absorbing liquid to increase the absorption efficiency.

FIG. 5 is a fragmentary sectional view of a heat transfer tube 1 in the absorber, showing the condition of generation of the Marangoni convection. An absorbing liquid 2 containing a surface active agent is deposited on the outer surface of the heat transfer tube 1. The absorbing liquid 2 is raised in the direction perpendicular to the axial direction of the tube 1 in such a manner that a plurality of ridges 3 extending in the circumferential direction of the tube 1 are formed in the axial direction of the tube 1. These ridges 3 are waved in the axial direction of the tube 1 and simultaneously flows down as shown in FIG. 6. The Marangoni convection is a convection generated by making surface tension of the liquid nonuniform. The generation of the Marangoni convection causes the formation of the ridges 3 of the absorbing liquid 2 in the flow-down direction thereof and shows a flow-down condition where the ridges 3 of the absorbing liquid 2 are allowed to flow down as waving in the axial direction of the tube 1.

Thus, a smooth tube is conventionally used as the heat transfer tube for the absorber, and the Marangoni convection is generated by adding the surface active agent to the absorbing liquid to thereby improve the performance to some extent.

However, the time of residence of the absorbing liquid on the outer surface of the smooth tube depends both on the viscosity of the absorbing liquid and on the surface condition of the smooth tube. There is a limit for elongation of the residence time of the absorbing liquid, and a wetted area of the outer surface of the smooth tube to be wetted with the absorbing liquid cannot be widened over a certain degree. In addition, there is a limit of the absorbing power of the absorbing liquid. While the absorbing power of the absorbing liquid can be enlarged by increasing the turbulence of the absorbing liquid, the two actions, i.e., the residence and the turbulence of the absorbing liquids, are contrary to each other, so that the improvement of the heat transfer performance is limited.

To make the performance higher and the structure more compact in a heat exchanger, various developments of a high-performance unsmoothed heat transfer tube improved in its heat transfer performance have been made instead of the smooth tube. For example, a low-fin tube having a large heat transfer area has been proposed to obtain a high heat transfer performance. However, the use of the low-fin tube hinders the Marangoni convection on the outer surface of the tube, thus making the turbulence of the absorbing liquid insufficient to result in a decrease in absorption performance. Then, developments of such a tube form as not to hinder the Marangoni convection have been made.

For example, there has been proposed a fluted tube having axially extending grooves on the outer surface as a tube form not hindering the waving of the absorbing liquid in the axial direction of the tube (Japanese Patent Laid-open No. 63-6364). The conventional fluted tube having the grooves on the outer surface has a cross section such that the top of each crest portion and the bottom of each trough portion formed on the outer surface of the tube are acute. Accordingly, when the absorbing liquid moves over each crest portion, there occurs rapid shrinkage of the absorbing liquid, resulting in generation of a locally dried portion where the absorbing liquid is locally absent on the outer surface of the tube or resulting in generation of an extremely thin film portion of the absorbing liquid having such a film thickness as not to contribute to the absorption.

Such a locally dried portion and an extremely thin film portion hardly contribute to heat transfer, so that an effective improvement in the performance cannot be obtained. Furthermore, an excessively thick film portion is also formed because of the acute shape of each trough portion, thus reducing the turbulence effect by the convection, so that an effective improvement in the performance cannot be obtained.

In absorbing water vapor by arranging a given number of stages of heat transfer tubes, the absorbing liquid must be stayed on the outer surface of each heat transfer tube for a certain period of time to increase the amount of water vapor to be absorbed. However, if the absorbing liquid is stayed for an undue period of time, the concentration of the absorbing liquid at a position of residence is decreased to cause a reduction in absorption power, thus resulting in a reduction in heat transfer performance.

SUMMARY OF THE INVENTION

It is accordingly an object of the present invention to provide a heat transfer tube for an absorber having an improved heat transfer performance which can promote the turbulence (Marangoni convection) of the absorbing liquid, widen the wetted area, and optimize the residence time of the absorbing liquid.

According to the present invention, there is provided a heat transfer tube for an absorber, comprising a plurality of crest portions and trough portions extending in parallel to each other in an axial direction of said tube and arranged alternately in a circumferential direction of said tube, wherein the ratio d/P of a depth d of each of said trough portions to a pitch P of said crest portions defined as $P=\pi D/n$ is set in the range of 0.1 to 0.4, the depth d is set in the range of 1.50 to 2.00 mm, the ratio $R_2/d$ is set in the range of 2.5 to 6.0, and the ratio $R_1/R_2$ is set larger than 1, where n represents a positive integer, $R_1$ represents a radius of curvature of an outer top surface of said each crest portion, $R_2$ represents a radius of curvature of an outer bottom surface of said each trough portion, and D represents a diameter of a circumscribed circle of said crest portions.

With this constitution, the turbulence (Marangoni convection) of the absorbing liquid can be promoted; the wetted area can be widened; and the residence time of the absorbing liquid can be optimized. Accordingly, the heat transfer tube of the present invention can exhibit an excellent heat transfer performance to show a remarkable effect in making a heat exchanger compact with a high performance.

Other objects and features of the invention will be more fully understood from the following detailed description and appended claims when taken with the accompanying drawings.

DETAILED DESCRIPTION OF THE PREFERRED EMBODIMENTS

Figure 2:
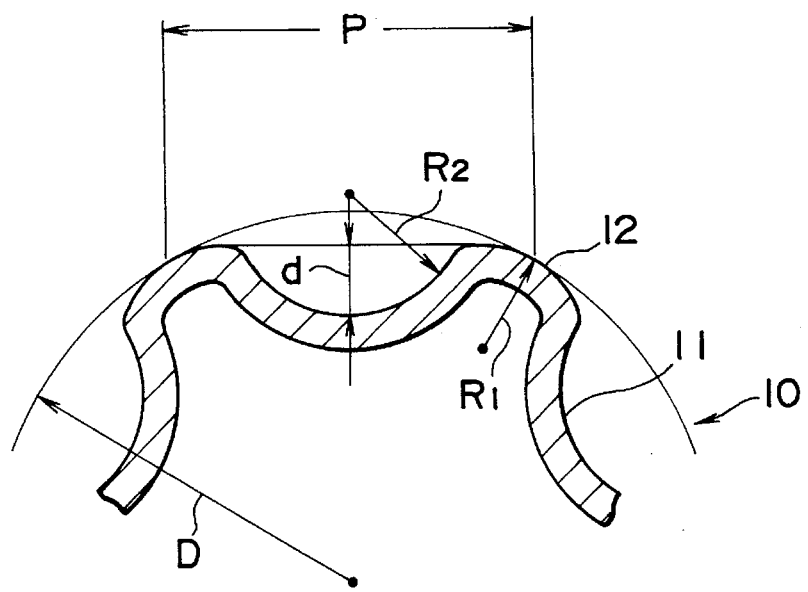
FIG. 2 is an enlarged view of a part of the heat transfer tube shown in FIG. 1.

As shown in FIG. 2, the depth d of each trough portion in the heat transfer tube for the absorber is defined as a distance between a common tangent of the adjacent crest portions each having the radius of curvature $R_1$ and a deepest point of the trough portion present between the adjacent crest portions. The pitch P of the crest portions is defined as an arc length represented by $\pi D/n$ where D stands for the diameter of a circumscribed circle of the heat transfer tube, and n stands for the number of the crest portions, which is a positive integer. The degree of curvature of each crest portion is represented by the radius of curvature $R_1$ of the outer top surface of each crest portion, and the degree of curvature of each trough portion is represented by the radius of curvature $R_2$ of the outer bottom surface of each trough portion. Although the radius of curvature $R_1$ of the outer top surface of each crest portion may be so large that the outer top surface becomes almost plane, that is, it becomes an almost straight line as viewed in cross section, the upper limit of the radius of curvature $R_1$ is preferably set to a value half or less than the outer diameter of the heat transfer tube of the present invention.

In the present invention, the crest portions and the trough portions are curved, and they are alternately arranged in the circumferential direction of the heat transfer tube in such a manner as to be smoothly changed. The reason why the crest portions and the trough portions are curved and continued smoothly so as to have the radius of curvature $R_1$ and the radius of curvature $R_2$, respectively, is that rapid shrinkage of the absorbing liquid near the crest portions is to be avoided to thereby prevent the generation of locally dried areas and prevent the film of the absorbing liquid from being extremely thinned.

The reason why the ratio $R_1/R_2$ is set larger than 1 to make the curvature of the crest portions gentler than the curvature of the trough portions is that rapid shrinkage of the absorbing liquid near the crest portions is to be relaxed to thereby prevent the generation of locally dried areas and prevent the film of the absorbing liquid from being remarkably thinned.

The reason why the depth d of each crest portion is set in the range of 1.50 to 2.00 mm is due to the following fact. If the depth d is smaller than 1.50 mm, the residence time of the absorbing liquid in the trough portions becomes short to cause a decrease in wetted area and a decrease in absorbing power of the absorbing liquid, with the result that the heat transfer performance is reduced. If the depth d is larger than 2.00 mm, the residence time of the absorbing liquid becomes too long to cause a phenomenon that the absorbing liquid saturated in its absorbing power after completing absorption of a given amount of water vapor still remains in the trough portions on the outer surface of the heat transfer tube, so that the concentration of the absorbing liquid in the trough portions is decreased and the turbulence of the absorbing liquid is also decreased to cause a decrease in absorbing power, with the result that the heat transfer performance is reduced. For this reason, the depth d of each trough portion is set in the range of 1.50 to 2.00 mm.

The reason why the ratio d/P of the depth d to the pitch P of the crest portions is set in the range of 0.1 to 0.4 is due to the following fact. If the ratio d/P is smaller than 0.1, the depth d is too small in contrast with the pitch P of the crest portions. Accordingly, the residence time of the absorbing liquid in the trough portions becomes short to cause a decrease in wetted area and a decrease in absorbing power of the absorbing liquid, with the result that the heat transfer performance is reduced. If the ratio d/P is larger than 0.4, the depth d is too large in contrast with the pitch P of the crest portions. Accordingly, the residence time of the absorbing liquid in the trough portions becomes too long to cause a phenomenon that the absorbing liquid saturated in its absorbing power after completing absorption of a given amount of water vapor still remains in the trough portions on the outer surface of the heat transfer tube, so that the concentration of the absorbing liquid in the trough portions is decreased and the turbulence of the absorbing liquid is also decreased to cause a decrease in absorbing power, with the result that the heat transfer performance is reduced.

The reason why the ratio $R_2/d$ of the radius of curvature $R_2$ of the outer bottom surface of each trough portion to the depth d of each trough portion is set in the range of 2.5 to 6.0 is due to the following fact. If the ratio $R_2/d$ is smaller than 2.5, the residence time of the absorbing liquid in the trough portions becomes too long to cause a phenomenon that the absorbing liquid saturated in its absorbing power after completing absorption of a given amount of water vapor still remains in the trough portions on the outer surface of the heat transfer tube, so that the concentration of the absorbing liquid in the trough portions is decreased and the turbulence of the absorbing liquid is also decreased to cause a decrease in absorbing power, with the result that the heat transfer performance is reduced. If the ratio $R_2/d$ is larger than 6.0, the outer surface of the heat transfer tube becomes less uneven like a smooth tube, so that there is a limit in elongation of the residence time of the absorbing liquid. Furthermore, the wetted area cannot be widened to limit the absorbing power. Although the absorbing power can be increased by promoting the turbulence, there is a limit in improvement of the heat transfer performance in consideration of the balance of interaction between the residence and the turbulence.

The heat transfer tube for the absorber according to a preferred embodiment of the present invention was actually manufactured to examine the heat transfer performance. The results of examination will now be described in connection with comparisons.

Figure 1:
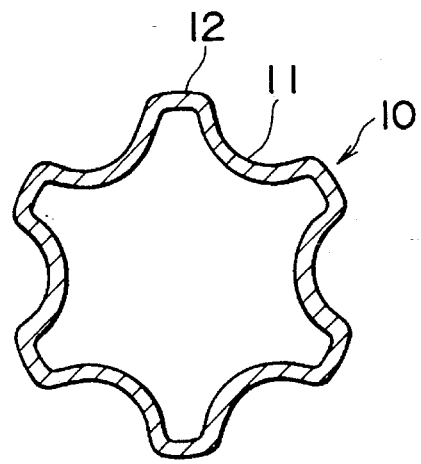
FIG. 1 is a cross section taken in the direction perpendicular to the axial direction of a heat transfer tube for an absorber according to a preferred embodiment of the present invention.

The heat transfer tube according to the preferred embodiment having the structure shown in FIGS. 1 and 2 can be formed by using a device having a separable die and a plug. The separable die is constructed by assembling a plurality of die elements arranged in the circumferential direction of a smooth tube, and the plug is arranged coaxially with the separable die. A plurality of projections and recesses both extending in the axial direction of the tube are formed on the inner surface of the separable die, and a plurality of recesses and projections respectively corresponding to the projections and the recesses of the separable die are formed on the outer surface of the plug. Then, the smooth tube set between the separable die and the plug is drawn to form the heat transfer tube having the crest portions and the trough portions.

In this preferred embodiment, a heat transfer tube 10 having a sectional shape as shown in FIG. 1 was manufactured by drawing a phosphorus deoxidized copper tube (JIS H3300 C1201) having an outer diameter of 19 mm and a wall thickness of 0.6 mm as a smooth tube set between the die and the plug both having the projections and the recesses extending in the axial direction. The heat transfer tube 10 has a plurality of trough portions 11 and crest portions 12 alternately arranged in the circumferential direction. Each trough portion 11 has a curved surface with a given radius of curvature, and each crest portion 12 also has a curved surface with a given radius of curvature. The size and dimensions of the tube 10 are shown in Table 1. The tube 10 has an effective length of 1050 mm. Ten tubes 10 extending horizontally in parallel were vertically arranged at a pitch of 25 mm to construct the absorber.

TABLE 1

| | Size of original tube | | Sizes of crest portions and trough portions | | | |
|---|---|---|---|---|---|---|
| Run | Outer diameter $D_0$ mm | Wall thickness $t_0$ mm | Outer diameter D mm | Groove pitch P mm | Groove depth d mm | d/P |
| Embodiments | | | | | | |
| 1 | 16.02 | 0.60 | 15.74 | 8.24 | 1.51 | 0.182 |
| 2 | " | 0.60 | 15.24 | 7.98 | 1.99 | 0.251 |
| Comparisons | | | | | | |
| 1 | " | 0.62 | 15.75 | 4.12 | 0.60 | 0.146 |
| 2 | " | 0.62 | 14.84 | 5.82 | 2.50 | 0.429 |
| 3 | " | 0.60 | 15.32 | 8.02 | 1.70 | 0.212 |
| 4 | " | " | 15.80 | 16.55 | 1.51 | 0.091 |
| 5 | " | " | 15.80 | 3.31 | 1.51 | 0.457 |
| 6 | " | " | 15.74 | 6.18 | 1.52 | 0.246 |
| 7 | " | " | 15.80 | 12.41 | 1.51 | 0.122 |
| 8 | " | " | — | — | — | — |

| | Sizes of crest portions and trough portions | | | |
|---|---|---|---|---|
| Run | Radius of curvature of each crest portion $R_1$ mm | Radius of curvature of each trough portion $R_2$ mm | $R_1/R_2$ | $R_2/d$ |
| Embodiments | | | | |
| 1 | 4.00 | 4.50 | 1.10 | 2.67 |
| 2 | 5.50 | 5.00 | 1.10 | 2.50 |
| Comparisons | | | | |
| 1 | 1.50 | 0.88 | 1.71 | 2.50 |
| 2 | 1.25 | 0.63 | 1.98 | 0.50 |
| 3 | 1.80 | 3.00 | 0.60 | 1.76 |
| 4 | 5.25 | 4.00 | 1.31 | 2.67 |
| 5 | 0.88 | 0.50 | 1.75 | 0.33 |
| 6 | 1.80 | 1.50 | 1.20 | 0.99 |
| 7 | 10.0 | 9.50 | 1.05 | 6.62 |
| 8 | — | — | — | — |

Figure 3:
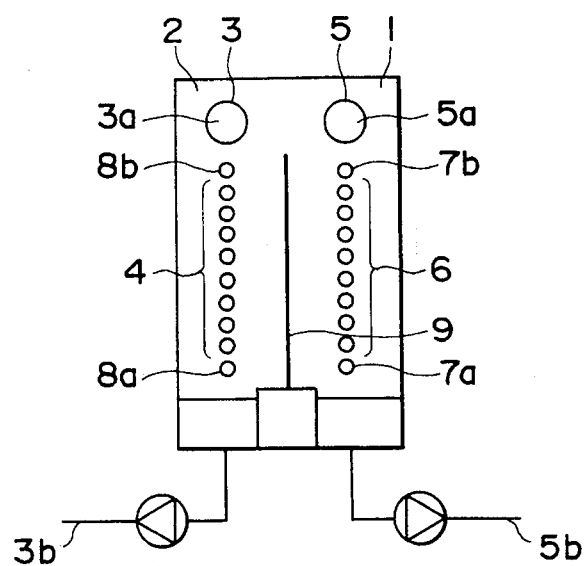
FIG. 3 is a schematic view of a testing device used for evaluation of absorption performance.

These sample tubes shown in Table 1 were mounted in a testing device shown in FIG. 3 to measure the absorption performance. The testing device is generally composed of an absorber 1 and an evaporator 2 partitioned from each other by a partition member 9. An absorber dripping tube 5 is provided in the absorber 1 at an upper portion thereof, and an evaporator dripping tube 3 is provided in the evaporator 2 at an upper portion thereof. Ten absorber sample tubes 6 extending horizontally in parallel are arranged vertically under the dripping tube 5, and ten evaporator sample tubes 4 extending horizontally in parallel are arranged vertically under the dripping tube 3. In the absorber 1, a cooling water introduced from a cooling water inlet 7a is allowed to flow through the absorber sample tubes 6 and is discharged from a cooling water outlet 7b. In the evaporator 2, a cold water introduced from a cold water inlet 8a is allowed to flow through the evaporator sample tubes 4 and is discharged from a cold water outlet 8b. A refrigerant introduced from a refrigerant inlet 3a into the evaporator dripping tube 3 is dripped in the evaporator 2 to flow down on the outer surfaces of the sample tubes 4, and is discharged from a refrigerant outlet 3b provided at a lower portion of the evaporator 2. A concentrated absorbing liquid introduced from a concentrated absorbing liquid inlet 5a into the absorber dripping tube 5 is dripped in the absorber 1 to be cooled, and is discharged from a dilute absorbing liquid outlet 5b. A transparent acrylic plate is mounted on the front surface of the testing device to allow observation of the flow-down condition of the absorbing liquid.

In the evaporator 2, the refrigerant is dripped from the dripping tube 3 to take heat of vaporization away from the water in the sample tubes 4, thus generating water vapor. In the absorber 1, the concentrated absorbing liquid is dripped from the dripping tube 5 onto the sample tubes 6. The cooling water is passed through the sample tubes 6 to remove heat of absorption generating upon absorption of water vapor, thereby maintaining the absorption efficiency and maintaining a constant pressure in the absorber.

Figure 5:
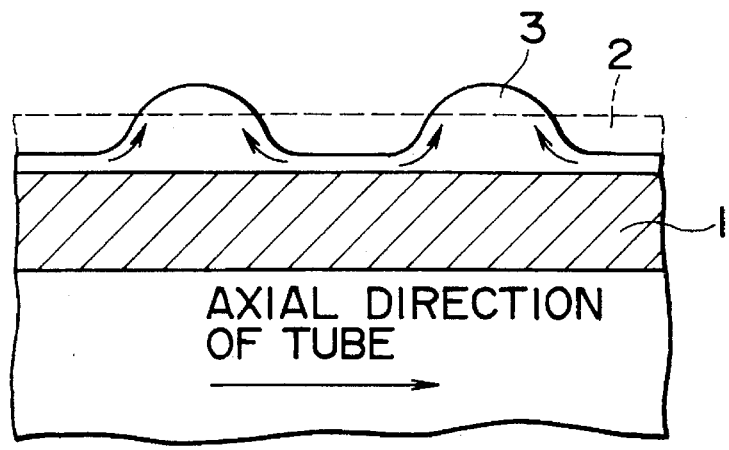
FIG. 5 is a schematic view showing the Marangoni convection of the absorbing liquid in absorbing refrigerant vapor.
Figure 6:
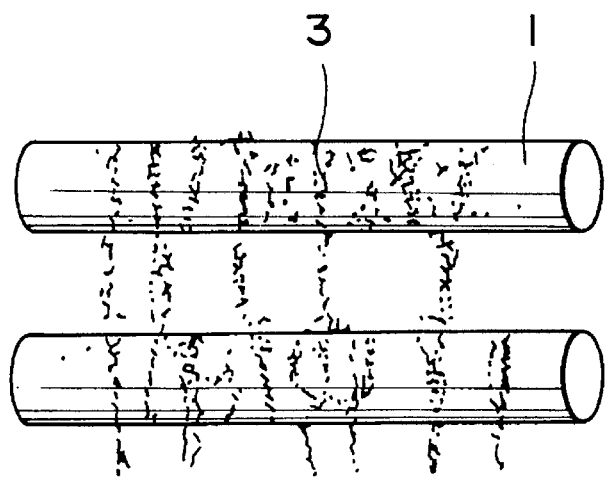
FIG. 6 is a schematic view showing the flow-down condition of the absorbing liquid on the smooth tube.

This testing device was operated under the conditions shown in Table 2. Lithium bromide was used as the absorbing liquid, and 0.2 vol % of 2-ethyl-1-hexanol as a surface active agent was added to the absorbing liquid, so as to improve the absorbing power. The addition of the surface active agent causes generation of Marangoni convection upon absorption of water vapor. As a result, the absorbing liquid flowing down is raised in the form of ridges and is waved in the axial direction of each tube 6 as shown in FIGS. 5 and 6. The flow-down condition of the absorbing liquid in each sample is shown in Table 3. In Comparison 8, however, a smooth tube was used, so that the flow-down condition of the absorbing liquid was observed on the outer circumferential surface of the smooth tube.

TABLE 2

| Items | Set conditions |
| --- | --- |
| Absorbing liquid inlet conc. | 61 wt % |
| Absorbing liquid inlet temp. | 43° C. |
| Absorbing liquid flow rate | 0.04, 0.06, 0.08 kg/m · s |
| Cooling water inlet temp. | 27° C. |
| Cooling water flow velocity | 1.5 m/s |
| Cold water outlet temp. | 7° C. |
| Pressure in absorber | 5.5–6.5 Torr |

TABLE 3

| | Flow-down condition of absorbing liquid Tube portions | |
| --- | --- | --- |
| Run | Trough portions | Crest portions |
| Embodiments | | |
| 1 | ○ | ○ |
| 2 | ○ | ○ |
| Comparisons | | |
| 1 | Δ | Δ |
| 2 | ▲ | Δ |
| 3 | Δ | X |
| 4 | Δ | Δ |

TABLE 3-continued

| | Flow-down condition of absorbing liquid Tube portions | |
| --- | --- | --- |
| Run | Trough portions | Crest portions |
| 5 | ▲ | Δ |
| 6 | ▲ | Δ |
| 7 | Δ | Δ |
| 8 | X | |

Table 3 shows visual evaluation of the flow-down condition of the absorbing liquid in dripping the absorbing liquid at a usual operational flow rate of 0.06 kg/m·s. In the trough portions, ○ represents the condition that the residence time of the absorbing liquid is proper; Δ represents the condition that the residence time is short; ▲ represents the condition that the residence time is long; and × represents the condition that the residence time is extremely short as in the smooth tube. On the other hand, in the crest portions, ○ represents the condition that the wetted area is wide to have a proper film thickness of the absorbing liquid; ▲ represents the condition that the film thickness in some area is extremely small as in the smooth tube; and × represents the condition that the film of the absorbing liquid is cut to generate a locally dried portion.

In Comparison 1, the groove depth d is smaller than 1.5 mm. Accordingly, the residence time in the trough portions is short, and the wetted area is also small. Furthermore, the film thickness of the absorbing liquid in some area of the crest portions is extremely small.

In Comparison 2, the groove depth d is larger than 2.0 mm, and the ratio $R_2/d$ is smaller than 2.5. Accordingly, the residence time in the trough portions is too long to cause a decrease in turbulence by Marangoni convection.

In Comparison 3, the ratio $R_2/R_1$ is smaller than 1, and the ratio $R_2/d$ is smaller than 2.5. Accordingly, the film of the absorbing liquid is rapidly shrunk when the absorbing liquid flows over the crest portions, causing the generation of a locally dried portion.

In Comparison 4, the ratio d/P is smaller than 0.1. Accordingly, the residence time of the absorbing liquid in the trough portions is short, and the wetted area is also small.

In Comparison 5, the ratio d/P is larger than 0.4. Accordingly, the residence time of the absorbing liquid in the trough portions is too long to cause a decrease in turbulence by Marangoni convection.

In Comparison 6, the ratio $R_2/d$ is smaller than 2.5. Accordingly, the residence time of the absorbing liquid in the trough portions is too long to cause a decrease in turbulence by Marangoni convection.

In Comparison 7, the ratio $R_2/d$ is larger than 6.0. Accordingly, the residence time of the absorbing liquid in the trough portions is short, and the wetted area is small.

In Comparison 8 using a smooth tube, a large turbulence of the absorbing liquid by the generation of Marangoni convection was observed. However, since no obstacles are present in the flow-down direction of the absorbing liquid, the absorbing liquid flows down quickly without residence, and the wetted area is not widened.

To the contrary, the heat transfer tubes in Embodiments 1 and 2 according to the present invention have advantages such that the residence time of the absorbing liquid in the trough portions is proper, the wetted area is large, and the turbulence effect of the absorbing liquid is also large.

Figure 4:
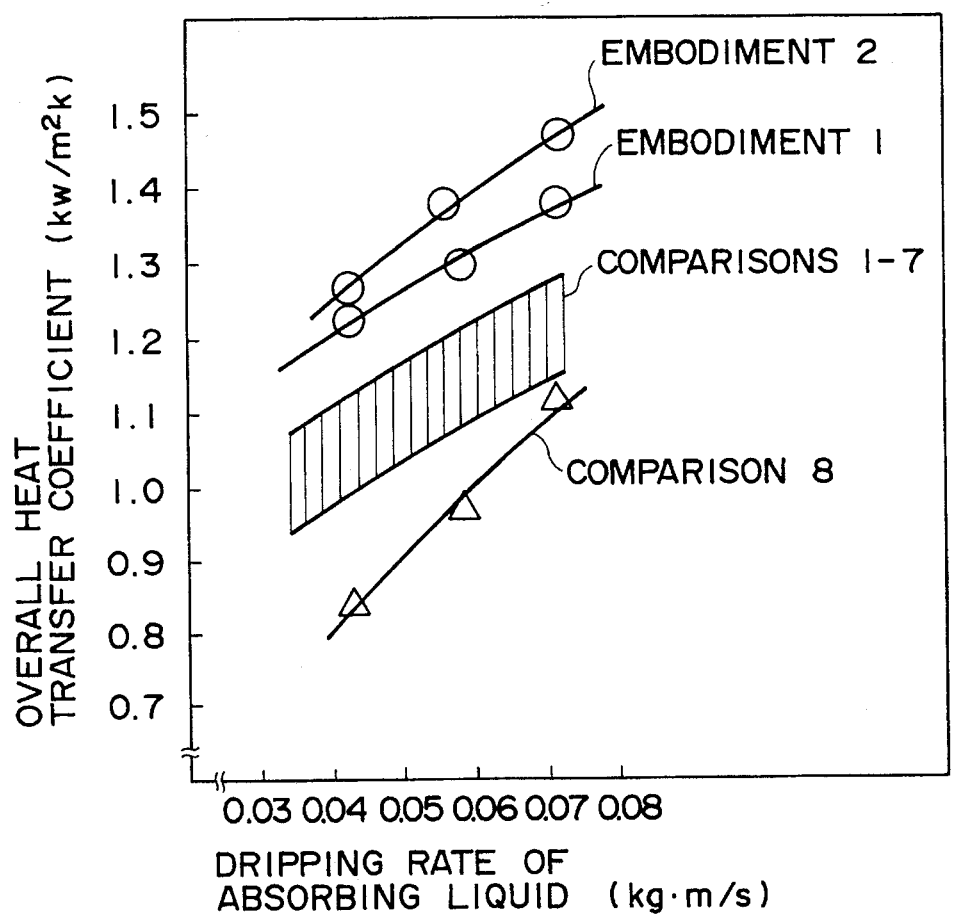
FIG. 4 is a graph showing measured heat transfer performances of the heat transfer tubes in the preferred embodiment of the present invention and the related art in the relation between a dripping rate of LiBr solution represented by the axis of abscissa and an overall heat transfer coefficient represented by the axis of ordinate.

FIG. 4 is a graph showing the results of measured heat transfer performance of the heat transfer tubes in Embodiments 1 and 2 and Comparisons 1 to 8, in which the axis of abscissa represents a dripping rate of the absorbing liquid and the axis of ordinate represents an overall heat transfer coefficient. In FIG. 4, the hatched area shows a range of overall heat transfer coefficients in Comparisons 1 to 7. As apparent from FIG. 4, in comparing the performances of the heat transfer tubes at the dripping rate of 0.06 kg/m.s, the heat transfer tubes in Embodiments 1 and 2 show the performance 1.35 to 1.45 times that in Comparison 8 using a smooth tube, and show the performance higher than that in Comparisons 1 to 7. In the comparison between Embodiments 1 and 2, the performance in Embodiment 2 is higher about 10% than that in Embodiment 1, because the depth of each trough portion in Embodiment 2 is larger than that in Embodiment 1 to show a longer residence time of the absorbing liquid.

While the heat transfer tube according to the preferred embodiment of the present invention is formed of copper, the present invention may be applied to any heat transfer tubes formed of different kinds of metals such as iron and stainless steel.

What is claimed is:

1. A heat transfer tube for an absorber, said tube comprising a Wall having plurality of crest portions and trough portions extending in parallel to each other in substantially an axial direction of said tube, said crest portions and trough portions being arranged alternately in a circumferential direction of said tube, wherein, at least on an outer surface of said wall, the ratio d/P of a depth d of each of said trough portions to a pitch P of said crest portion defined as $P=\pi D/n$ is set in the range of 0.1 to 0.4, the depth d is set in the range of 1.5 to 2.0 mm, the ratio $R_2/d$ is set in the range of 2.5 to 6.0, and the ratio $R_1/R_2$ is set larger than 1, where n represents a positive integer, $R_1$ represents a radius of curvature of an outer top surface of said each crest portion, $R_2$ represents a radius of curvature of an outer bottom surface of said each trough portion, and D represents a diameter of a circumscribed circle of said crest portions.

* * * * *